US011964462B2

United States Patent
Akamatsu et al.

(10) Patent No.: US 11,964,462 B2
(45) Date of Patent: Apr. 23, 2024

(54) ELECTRICAL DEBONDING ADHESIVE SHEET, JOINED BODY, AND JOINING AND SEPARATION METHOD FOR ADHEREND

(71) Applicant: NITTO DENKO CORPORATION, Ibaraki (JP)

(72) Inventors: Kaori Akamatsu, Ibaraki (JP); Kaori Mizobata, Ibaraki (JP); Ryo Awane, Ibaraki (JP); Akira Hirao, Ibaraki (JP); Junji Yokoyama, Ibaraki (JP); Yosuke Shimizu, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 18/178,670

(22) Filed: Mar. 6, 2023

(65) Prior Publication Data

US 2023/0256710 A1 Aug. 17, 2023

Related U.S. Application Data

(62) Division of application No. 16/979,014, filed as application No. PCT/JP2019/008825 on Mar. 6, 2019, now Pat. No. 11,623,429.

(30) Foreign Application Priority Data

Mar. 8, 2018 (JP) .................................. 2018-042353

(51) Int. Cl.
*B32B 7/06* (2019.01)
*B32B 3/04* (2006.01)
(Continued)

(52) U.S. Cl.
CPC .................. *B32B 7/06* (2013.01); *B32B 3/04* (2013.01); *B32B 7/12* (2013.01); *B32B 27/308* (2013.01);
(Continued)

(58) Field of Classification Search
None
See application file for complete search history.

(56) References Cited

U.S. PATENT DOCUMENTS 7,332,218 B1 2/2008 Gilbert
2001/0031367 A1 10/2001 Gilbert
(Continued)

FOREIGN PATENT DOCUMENTS

| CN | 105102568 A | 11/2015 |
| CN | 105143385 A | 12/2015 |

(Continued)

OTHER PUBLICATIONS

International Search Report issued for corresponding International Patent Application No. PCT/JP2019/008825 dated May 14, 2019, along with an English translation.
(Continued)

*Primary Examiner* — Alexander S Thomas
(74) *Attorney, Agent, or Firm* — HAUPTMAN HAM, LLP (57) ABSTRACT

The present invention provides an electrical debonding type adhesive sheet capable of producing a joined body in which a voltage can be stably applied to an electrical debonding type adhesive layer. An electrical debonding type adhesive sheet according to a first embodiment of the present invention includes a first adhesive layer, a substrate for voltage application including an electroconductive layer and a base layer, and a second adhesive layer in this order, and has a first protrudent part, in which the first adhesive layer and the substrate for voltage application extend and protrude with respect to the second adhesive layer, and a second protrudent part, in which the substrate for voltage application extends from the first protrudent part and protrudes with respect to the first adhesive layer.

1 Claim, 6 Drawing Sheets

(51) Int. Cl.
    *B32B 7/12*    (2006.01)
    *B32B 27/30*   (2006.01)
    *B32B 27/36*   (2006.01)
    *B32B 43/00*   (2006.01)
(52) U.S. Cl.
    CPC .......... *B32B 27/36* (2013.01); *B32B 43/006* (2013.01); *B32B 2307/202* (2013.01); *B32B 2405/00* (2013.01); *Y10T 428/24752* (2015.01)

(56) References Cited

U.S. PATENT DOCUMENTS

| | | |
|---|---|---|
| 2008/0196828 A1 | 8/2008 | Gilbert |
| 2008/0283415 A1 | 11/2008 | Gilbert |
| 2009/0035580 A1 | 2/2009 | Chino et al. |
| 2010/0000878 A1 | 1/2010 | Gilbert |
| 2016/0009961 A1 | 1/2016 | Yamada et al. |
| 2016/0009962 A1 | 1/2016 | Yamada et al. |
| 2018/0265750 A1 | 9/2018 | Akamatsu et al. |
| 2018/0305593 A1 | 10/2018 | Akamatsu et al. |
| 2019/0031929 A1 | 1/2019 | Akamatsu et al. |
| 2022/0177734 A1 | 6/2022 | Akamatsu et al. |

FOREIGN PATENT DOCUMENTS

| | | |
|---|---|---|
| CN | 108138002 A | 6/2018 |
| EP | 3363873 A1 | 8/2018 |
| JP | 2003-12903 A | 1/2003 |
| JP | 2003-129030 A | 5/2003 |
| JP | 2013-6929 A | 1/2013 |
| WO | 2007/018239 A1 | 2/2007 |
| WO | 2014/157408 A1 | 10/2014 |
| WO | 2017/064918 A1 | 4/2017 |
| WO | 2017/064925 A1 | 4/2017 |

OTHER PUBLICATIONS

Written Opinion issued for corresponding International Patent Application No. PCT/JP2019/008825 dated May 14, 2019, along with an English translation.

Extended European Search Report dated Nov. 16, 2021, for corresponding European Patent Application No. 19764294.5.

Office Action dated Jun. 8, 2022 for corresponding Chinese Patent Application No. 21980016859.2, along with an English translation (11 pages).

ELECTRICAL DEBONDING ADHESIVE SHEET, JOINED BODY, AND JOINING AND SEPARATION METHOD FOR ADHEREND

CROSS REFERENCE TO RELATED APPLICATION

This application is a divisional of U.S. patent application Ser. No. 16/979,014 filed on Sep. 8, 2020, which is the National Phase Application of International Application No. PCT/JP2019/008825 filed on Mar. 6, 2019 which designates the United States and was published in Japan, which claims the priority of Japanese Patent Application No. 2018-042353 filed on Mar. 8, 2018 in the JPO (Japanese Patent Office). All of the aforementioned applications are hereby incorporated by reference in their entireties.

TECHNICAL FIELD

The present invention relates to electrical debonding type adhesive sheets, joined bodies including the adhesive sheets and adherends, and methods for joining and separating adherends using the adhesive sheets.

There are growing demands regarding, for example, reworking for improving yield in electronic-component production steps, etc. and recycling for disassembling and recovering components after use. In order to meet such demands, a double-sided adhesive sheet having certain adhesive force and certain debonding properties is sometimes utilized for joining members in electronic-component manufacturing steps, etc.

Known as a double-sided adhesive sheet combining adhesive force and debonding properties is an adhesive sheet (electrical debonding type adhesive sheet) which includes an electrical debonding type adhesive layer constituted of an electrically debondable adhesive composition and which undergoes debonding upon voltage application to the adhesive layer (Patent Document 1).

CITATION LIST

Patent Literature

Patent Document 1: International Publication WO 2017/064925

SUMMARY OF THE INVENTION

Technical Problems

Such an adhesive sheet may consist only of an electrical debonding type adhesive layer, but is preferably an adhesive sheet including a base layer, in view of handleability and suitability for distribution.

This base layer is required to have electrical conductivity for voltage application to the electrical debonding type adhesive layer. However, in cases when a metal foil is used as the base, burrs are prone to result when this adhesive sheet is punched. The presence of such burrs may cause a short circuit between the metal foil and an adherend, making it impossible to apply a voltage to the electrical debonding type adhesive layer.

It is hence preferable that a substrate for voltage application obtained by forming an electroconductive layer, e.g., a vapor-deposited thin metal film, on a base layer such as, for example, a PET film is used as a substrate in the electrical debonding type adhesive sheet.

Components which are joined to each other by such an electrical debonding type adhesive sheet are debonded while applying a voltage to the electrical debonding type adhesive layer, which is constituted of an electrically debondable adhesive composition. By improving the efficiency of this voltage application, the efficiency of the whole operation of debonding can be improved.

Patent Document 1 discloses an electrical debonding type adhesive sheet having a configuration including a protrudent part in which a substrate for voltage application extends with respect to a first adhesive layer and a second adhesive layer in a plane direction of the substrate for voltage application and is exposed, in order to improve the efficiency of voltage application. This configuration is intended to make an electrical contact between a terminal of a voltage application device and the substrate for voltage application more apt to occur, by exposing some of the substrate for voltage application, which is usually covered with an insulating adhesive layer.

However, such configuration is disadvantageous in that the protrudent part is not fixed with an adhesive and is hence unstable and there is a possibility that the protrudent part might undesirably come into electrical contact with an unintended portion in applying a voltage, making it impossible to properly apply a voltage to the electrical debonding type adhesive layer. Moreover, since the substrate for voltage application is thin and flexible, the contact with the terminal of a voltage application device is prone to be unstable and this is prone to result in an increase in the number of steps for the operation of debonding.

There has hence been a desire for an electrical debonding type adhesive sheet capable of producing a joined body in which a voltage can be more stably applied to the electrical debonding type adhesive layer.

The present invention has been conceived under such circumstances, and an object of the present invention is to provide electrical debonding type adhesive sheets capable of producing joined bodies in which a voltage can be stably applied to the electrical debonding type adhesive layers. The present invention further provides joined bodies produced using such electrical debonding type adhesive sheets and methods for joining and separating adherends using such electrical debonding type adhesive sheets.

Solutions to the Problems

The present inventors diligently made investigations and, as a result, have discovered that those objects can be accomplished with electrical debonding type adhesive sheets having specific configurations.

Specifically, an electrical debonding type adhesive sheet according to a first embodiment of the present invention is an electrical debonding type adhesive sheet including a substrate for voltage application, which includes an electroconductive layer and a base layer, a first adhesive layer, which is constituted of an electrically debondable adhesive and is formed on the electroconductive layer of the substrate for voltage application, and a second adhesive layer, which is formed on the base layer of the substrate for voltage application, the electrical debonding type adhesive sheet having: a first protrudent part, in which the first adhesive layer and the substrate for voltage application extend and protrude with respect to the second adhesive layer in a plane direction of the electrical debonding type adhesive sheet; and a second protrudent part, in which the substrate for voltage application extends from the first protrudent part and protrudes with respect to the first adhesive layer in a plane direction of the electrical debonding type adhesive sheet.

A joined body according to the first embodiment of the present invention is a joined body including the electrical debonding type adhesive sheet according to the first embodiment of the present invention, a first adherend, and a second adherend, wherein the first protrudent part of the electrical debonding type adhesive sheet is folded back toward the second adhesive layer, the first adherend is adhered to the electrical debonding type adhesive sheet by a portion of the first adhesive layer which is not folded back, and the second adherend is adhered to the electrical debonding type adhesive sheet by both the second adhesive layer and the folded portion of the first adhesive layer and is in contact with the electroconductive layer lying in the second protrudent part.

A method for joining and separating adherends according to the first embodiment of the present invention includes: folding back the first protrudent part of the electrical debonding type adhesive sheet according to the first embodiment of the present invention toward the second adhesive layer; adhering a first adherend to a portion of the first adhesive layer which is not folded back; adhering a second adherend to both the second adhesive layer and the folded portion of the first adhesive layer, thereby joining the first adherend and the second adherend to each other; and thereafter applying a voltage to the first adhesive layer so as to result in a difference in potential in a thickness direction thereof, thereby separating the first adherend and the second adherend from each other.

An electrical debonding type adhesive sheet according to a second embodiment of the present invention is an electrical debonding type adhesive sheet including a substrate for voltage application, which includes an electroconductive layer and a base layer, a first adhesive layer, which is constituted of an electrically debondable adhesive and is formed on the electroconductive layer of the substrate for voltage application, and a second adhesive layer, which is formed on the base layer of the substrate for voltage application, the electrical debonding type adhesive sheet having a protrudent part in which the second adhesive layer and the substrate for voltage application extend and protrude with respect to the first adhesive layer in a plane direction of the electrical debonding type adhesive sheet.

A joined body according to the second embodiment of the present invention is a joined body including the electrical debonding type adhesive sheet according to the second embodiment of the present invention, a first adherend, and a second adherend, wherein the second adherend is adhered to the electrical debonding type adhesive sheet by the second adhesive layer, some of the electrical debonding type adhesive sheet is folded back along an end of the second adherend so that some of the second adherend is sandwiched, at least some of the protrudent part is adhered, by the second adhesive layer, to that surface of the second adherend which is on the reverse side from the first adherend, and the first adherend is adhered to the electrical debonding type adhesive sheet by a portion of the first adhesive layer which is not folded back.

A method for joining and separating adherends according to the second embodiment of the present invention includes: folding back some of the electrical debonding type adhesive sheet according to the second embodiment of the present invention along an end of a second adherend so that some of the second adherend is sandwiched, and adhering the electrical debonding type adhesive sheet to the second adherend by the second adhesive layer; applying a portion of the first adhesive layer which is not folded back to a first adherend to join the first adherend and the second adherend to each other so that at least some of the protrudent part is adhered, by the second adhesive layer, to that surface of the second adherend which is on the reverse side from the first adherend; and thereafter applying a voltage to the first adhesive layer so as to result in a difference in potential in a thickness direction thereof, thereby separating the first adherend and the second adherend from each other.

Advantageous Effects Of Invention

The electrical debonding type adhesive sheets of the present invention can provide joined bodies that can be electrically debonded stably. The joined bodies of the present invention can be electrically debonded stably. The methods of the invention for joining and debonding adherends render stable electrical debonding possible.

DESCRIPTION OF EMBODIMENTS

Modes for carrying out the present invention are explained in detail below. However, the present invention is not limited to the embodiments described below.

First Embodiment

<Adhesive Sheet>

Figure 1:
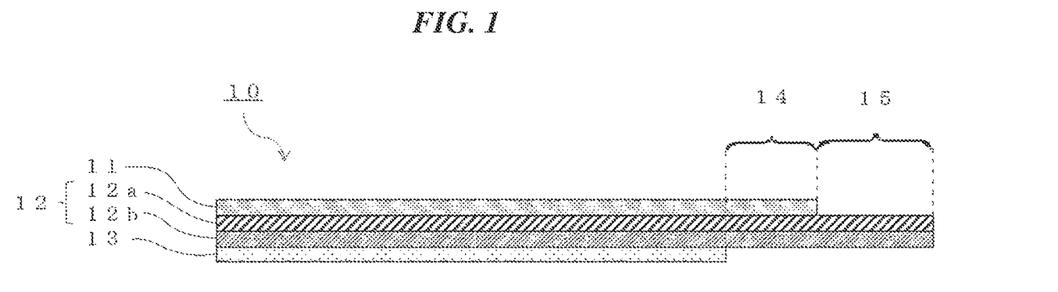
FIG. 1 is a diagrammatic view of an electrical debonding type adhesive sheet according to the first embodiment of the present invention.

FIG. 1 is a diagrammatic view of an electrical debonding type adhesive sheet 10 according to the first embodiment of the present invention (hereinafter also referred to simply as "adhesive sheet 10 according to this embodiment" or "adhesive sheet 10"). The adhesive sheet 10 according to this embodiment is an electrical debonding type adhesive sheet including a substrate for voltage application 12, which includes an electroconductive layer 12a and a base layer 12b, a first adhesive layer 11, which is constituted of an electrically debondable adhesive and is formed on the electroconductive layer 12a of the substrate for voltage application 12, and a second adhesive layer 13, which is formed on the base layer 12b of the substrate for voltage application 12, the electrical debonding type adhesive sheet 10 having: a first protrudent part 14, in which the first adhesive layer 11 and the substrate for voltage application 12 extend and protrude with respect to the second adhesive layer 13 in a plane direction of the electrical debonding type adhesive sheet 10; and a second protrudent part 15, in which the substrate for voltage application 12 extends from the first protrudent part and protrudes with respect to the first adhesive layer 11 in a plane direction of the electrical debonding type adhesive sheet 10.

(Constituent Elements of the Adhesive Sheet)

First, the layers and protrudent parts which constitute the adhesive sheet according to the first embodiment are explained.

The first adhesive layer 11 is an adhesive layer constituted of an electrically debondable adhesive and includes both a polymer as an adhesive and an electrolyte.

Examples of the polymer included in the first adhesive layer 11 include acrylic polymers, rubber-based polymers, vinyl-alkyl-ether-based polymers, silicone-based polymers, polyester-based polymers, polyamide-based polymers, urethane-based polymers, fluoropolymers, and epoxy-based polymers. The first adhesive layer 11 may include one polymer as the only polymer or may include two or more polymers.

From the standpoints of inhibiting cost increase and attaining high production efficiency, it is preferable that the first adhesive layer 11 includes an acrylic polymer. An acrylic polymer is a polymer which includes monomer units derived from an alkyl acrylate and/or an alkyl methacrylate, as main monomer units contained in a largest amount in terms of mass proportion. Hereinafter, "(meth)acrylic" represents "acrylic" and/or "methacrylic".

In the case where the first adhesive layer 11 includes an acrylic polymer, it is preferable that the acrylic polymer includes monomer units derived from an alkyl (meth)acrylate in which the alkyl group has 1-14 carbon atoms. Examples of the alkyl (meth)acrylate include methyl (meth) acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth) acrylate, isopentyl (meth)acrylate, hexyl (meth)acrylate, 2-ethylbutyl (meth)acrylate, heptyl (meth)acrylate, n-octyl (meth)acrylate, isooctyl (meth)acrylate, 2-ethylhexyl (meth) acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. Preferred of these are n-butyl (meth)acrylate, sec-butyl (meth)acrylate, n-octyl (meth)acrylate, isooctyl (meth)acrylate, 2-ethylhexyl (meth)acrylate, n-nonyl (meth)acrylate, and isononyl (meth)acrylate. One alkyl (meth)acrylate may be used, or two or more alkyl (meth) acrylates may be used.

In the acrylic polymer, the proportion of the monomer units derived from an alkyl (meth)acrylate in which the alkyl group has 1-14 carbon atoms is preferably 50% by mass or higher, more preferably 60% by mass or higher, still more preferably 70% by mass or higher, yet still more preferably 80% by mass or higher, from the standpoint of enabling the first adhesive layer 11 to have high adhesive force. That is, the proportion of the alkyl (meth)acrylate in which the alkyl group has 1-14 carbon atoms to the sum of the starting-material monomers for forming the acrylic polymer is preferably 50% by mass or higher, more preferably 60% by mass or higher, still more preferably 70% by mass or higher, yet still more preferably 80% by mass or higher, from the standpoint of enabling the first adhesive layer 11 to have high adhesive force.

In the case where the first adhesive layer 11 includes an acrylic polymer, it is preferable that the acrylic polymer contains monomer units derived from a monomer containing a polar group, from the standpoint of enabling the first adhesive layer 11 to have high adhesive force. Examples of the monomer containing a polar group include carboxyl-group-containing monomers, hydroxyl-group-containing monomers, and vinyl-group-containing monomers.

Examples of the carboxyl-group-containing monomers include acrylic acid, methacrylic acid, itaconic acid, maleic acid, fumaric acid, crotonic acid, isocrotonic acid, carboxyethyl (meth)acrylate, and carboxypentyl (meth)acrylate. Preferred of these are acrylic acid and methacrylic acid. One carboxyl-group-containing monomer may be used, or two or more carboxyl-group-containing monomers may be used.

Examples of the hydroxyl-group-containing monomers include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutyl vinyl ether, and diethylene glycol monovinyl ether. Preferred of these is 2-hydroxyethyl (meth)acrylate. One hydroxyl-group-containing monomer may be used, or two or more hydroxyl-group-containing monomers may be used.

Examples of the vinyl-group-containing monomers include vinyl acetate, vinyl propionate, and vinyl laurate. Preferred of these is vinyl acetate. One vinyl-group-containing monomer may be used, or two or more vinyl-group-containing monomers may be used.

In the acrylic polymer, the proportion of the monomer units derived from a monomer containing a polar group is preferably 0.1% by mass or higher from the standpoint of enabling the first adhesive layer 11 to retain cohesive force and thereby preventing the first adhesive layer 11 from causing an adhesive transfer to the debonded adherend surface. That is, the proportion of the monomer containing a polar group to the sum of the starting-material monomers for constituting the acrylic polymer is preferably 0.1% by mass or higher from the standpoints of ensuring cohesive force and preventing the occurrence of an adhesive transfer. Meanwhile, from the standpoint of causing the acrylic polymer to properly exhibit properties attributable to the monomer units derived from the alkyl (meth)acrylate, in which the alkyl group has 1-14 carbon atoms, the proportion of the monomer units derived from a monomer containing a polar group in the acrylic polymer is preferably 30% by mass or less. That is, the proportion of the monomer containing a polar group to the sum of the starting-material monomers for constituting the acrylic polymer is preferably 30% by mass or less from the standpoint of causing the acrylic polymer to exhibit the properties.

Methods for polymerizing such monomers to obtain the acrylic polymer are not particularly limited, and known methods can be used. Examples of polymerization techniques include solution polymerization, emulsion polymerization, bulk polymerization, and suspension polymerization.

The content of the polymer in the first adhesive layer 11 is preferably 70% by mass or higher, more preferably 80% by mass or higher, still more preferably 85% by mass or higher, yet still more preferably 90% by mass or higher, from the standpoint of enabling the first adhesive layer 11 to have sufficient adhesive force.

The electrolyte contained in the first adhesive layer 11 is a substance capable of being ionized into one or more anions and one or more cations. Examples of the electrolyte include ionic liquids, alkali metal salts, and alkaline-earth metal salts. The electrolyte contained in the first adhesive layer 11 is preferably an ionic liquid from the standpoint of enabling the first adhesive layer 11 to have satisfactory electrically debonding properties. The ionic liquid is a salt which is liquid at room temperature (about 25° C.), and includes an anion and a cation.

In the case where the first adhesive layer 11 contains an ionic liquid, it is preferable that this ionic liquid includes one or more anions which are at least one anion selected from the group consisting of $(FSO_2)_2N^-$, $(CF_3SO_2)_2N^-$, $(CF_3CF_2SO_2)_2N^-$, $(CF_3SO_2)_3C^-$, $Br^-$, $AlCl_4^-$, $Al_2Cl_7^-$, $NO_3^-$, $BF_4^-$, $PF_6^-$, $CH_3COO^-$, $CF_3COO^-$, $CF_3CF_2CF_2COO^-$, $CF_3SO_3^-$, $CF_3(CF_2)_3SO_3^-$, $AsF_6^-$, $SbF_6^-$, and $F(HF)_n^-$. Preferred of these anions are $(FSO_2)_2N^-$ [bis(fluorosulfonyl)imide anion] and $(CF_3SO_2)_2N^-$ [bis(trifluoromethanesulfonyl)imide anion], because these anions are chemically stable and are suitable for attaining the electrically debonding properties of the first adhesive layer 11.

In the case where the first adhesive layer 11 contains an ionic liquid, it is preferable that this ionic liquid includes one or more cations which are at least one cation selected from the group consisting of imidazolium cations, pyridinium cations, pyrrolidinium cations, and ammonium cations.

Examples of the imidazolium cations include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-hexyl-3-methylimidazolium cation, 1-heptyl-3-methylimidazolium cation, 1-octyl-3-methylimidazolium cation, 1-nonyl-3-methylimidazolium cation, 1-undecyl-3-methylimidazolium cation, 1-dodecyl-3-methylimidazolium cation, 1-tridecyl-3-methylimidazolium cation, 1-tetradecyl-3-methylimidazolium cation, 1-pentadecyl-3-methylimidazolium cation, 1-hexadecyl-3-methylimidazolium cation, 1-heptadecyl-3-methylimidazolium cation, 1-octadecyl-3-methylimidazolium cation, 1-undecyl-3-methylimidazolium cation, 1-benzyl-3-methylimidazolium cation, 1-butyl-2,3-dimethylimidazolium cation, and 1,3-bis(dodecyl)imidazolium cation.

Examples of the pyridinium cations include 1-butylpyridinium cation, 1-hexylpyridinium cation, 1-butyl-3-methylpyridinium cation, 1-butyl-4-methylpyridinium cation, and 1-octyl-4-methylpyridinium cation.

Examples of the pyrrolidinium cations include 1-ethyl-1-methylpyrrolidinium cation and 1-butyl-1-methylpyrrolidinium cation.

Examples of the ammonium cations include tetraethylammonium cation, tetrabutylammonium cation, methyltrioctylammonium cation, tetradecyltrihexylammonium cation, glycidyltrimethylammonium cation, and trimethylaminoethyl acrylate cation.

Especially preferred as the ionic liquid in the first adhesive layer 11 is an ionic liquid including both $(FSO_2)_2M^-$ [bis(fluorosulfonyl)imide anion] and a cation having a molecular weight of 160 or less, from the standpoint of utilizing the high diffusibility of the cations to impart high electrically debonding properties to the first adhesive layer 11. Examples of the cation having a molecular weight of 160 or less include 1-methylimidazolium cation, 1-ethyl-3-methylimidazolium cation, 1-propyl-3-methylimidazolium cation, 1-butyl-3-methylimidazolium cation, 1-pentyl-3-methylimidazolium cation, 1-butylpyridinium cation, 1-hexylpyridinium cation, 1-butyl-3-methylpyridinium cation, 1-butyl-4-methylpyridinium cation, 1-ethyl-1-methylpyrrolidinium cation, 1-butyl-1-methylpyrrolidinium cation, tetraethylammonium cation, glycidyltrimethylammonium cation, and trimethylaminoethyl acrylate cation.

Examples of commercial products of ionic liquids which can be contained in the first adhesive layer 11 include "ELEXCEL AS-110", "ELEXCEL MP-442", "ELEXCEL IL-210", "ELEXCEL MP-471", "ELEXCEL MP-456", and "ELEXCEL AS-804", all manufactured by Dai-ichi Kogyo Seiyaku Co., Ltd.

Examples of the alkali metal salts include LiCl, $Li_2SO_4$, $LiBF_4$, $LiPF_6$, $LiClO_4$, $LiAsF_6$, $LiCF_3SO_3$, $LiN(SO_2CF_3)_2$, $LiN(SO_2C_2F_5)_2$, $LiC(SO_2CF_3)_3$, NaCl, $Na_2SO_4$, $NaBF_4$, $NaPF_6$, $NaClO_4$, $NaAsF_6$, $NaCF_3SO_3$, $NaN(SO_2CF_3)_2$, $NaN(SO_2C_2F_5)_2$, $NaC(SO_2CF_3)_3$, KCl, $K_2SO_4$, $KBF_4$, $KPF_6$, $KClO_4$, $KAsF_6$, $KCF_3SO_3$, $KN(SO_2CF_3)_2$, $KN(SO_2C_2F_5)_2$, and $KC(SO_2CF_3)_3$.

The content of an ionic liquid in the first adhesive layer 11 per 100 parts by mass of the polymer in the first adhesive layer 11 is, for example, 0.1 part by mass or higher from the standpoint of imparting electrically debonding properties to the first adhesive layer 11. From the standpoint of attaining better electrically debonding properties, the content of the ionic liquid is preferably 0.5 parts by mass or higher, more preferably 0.6 parts by mass or higher, still more preferably 0.8 parts by mass or higher, especially preferably 1.0 part by mass or higher, most preferably 1.5 parts by mass or higher. From the standpoint of enabling the first adhesive layer 11 to attain a satisfactory balance between satisfactory adhesive force and electrically debonding properties, the content of the ionic liquid in the first adhesive layer 11, per 100 parts by mass of the polymer in the first adhesive layer 11, is preferably 30 parts by mass or less, more preferably 20 parts by mass or less, still more preferably 15 parts by mass or less, especially preferably 10 parts by mass or less, most preferably 5 parts by mass or less.

The first adhesive layer 11 may contain other ingredients so long as the inclusion thereof does not lessen the effects of the present invention. Examples of the ingredients include tackifiers, silane coupling agents, colorants, pigments, dyes, surface lubricants, leveling agents, softeners, antioxidants, aging inhibitors, light stabilizers, polymerization inhibitors, inorganic or organic fillers, metal powders, particulate substances, and flaky substances. The content of such ingredients may be determined in accordance with intended uses so long as the effects of the present invention are not lessened. For example, the content thereof is 10 parts by mass or less per 100 parts by mass of the polymer.

The thickness of the first adhesive layer 11 is not particularly limited. However, from the standpoint of enabling the first adhesive layer 11 to have satisfactory adhesiveness, the thickness thereof is preferably 1 μm or larger, more preferably 3 μm or larger, still more preferably 5 μm or larger, especially preferably 8 μm or larger. Meanwhile, from the standpoint of attaining a reduction in the voltage to be applied in adherend debonding, the thickness of the first adhesive layer 11 is preferably 1,000 μm or less, more preferably 500 μm or less, still more preferably 100 μm or less, especially preferably 30 μm or less.

The second adhesive layer 13 includes a polymer for causing the second adhesive layer 13 to exhibit adhesiveness. Ingredients which can be included in the second adhesive layer 13 and the contents thereof, except for electrolytes, are the same as the ingredients which can be included in the first adhesive layer 11 and the contents thereof, which were described above.

The thickness of the second adhesive layer 13 is not particularly limited. However, from the standpoint of enabling the second adhesive layer 13 to have satisfactory adhesiveness, the thickness thereof is preferably 1 μm or larger, more preferably 3 μm or larger, still more preferably 5 μm or larger, especially preferably 8 μm or larger. Meanwhile, the thickness of the second adhesive layer 13 is preferably 1,000 μm or less, more preferably 500 μm or less, still more preferably 100 μm or less.

The substrate for voltage application 12 is not particularly limited so long as it has a multilayer structure including an electroconductive layer 12a and a base layer 12b. For example, use can be made of an aluminum-coated film including a plastic film and a vapor-deposited aluminum film formed thereon.

The thickness of the substrate for voltage application 12 is not particularly limited. However, the thickness thereof is preferably 10 μm or larger, more preferably 12 μm or larger, still more preferably 25 μm or larger. Meanwhile, the thickness of the substrate for voltage application 12 is preferably 1,000 μm or less, more preferably 500 μm or less, still more preferably 300 μm or less, especially preferably 100 μm or less.

The base layer 12b is a portion functioning as a support. Examples thereof include plastic bases, fibrous bases, paper bases, and laminates of these. The base layer 12b may have a single-layer structure or may be composed of two or more layers. The base layer 12b may have undergone any of various treatments including a back-surface treatment, antistatic treatment, and priming, according to need.

The thickness of the base layer 12b is not particularly limited. However, the thickness thereof is preferably 10 μm or larger, more preferably 12 μm or larger, still more preferably 25 μm or larger. Meanwhile, the thickness of the base layer 12b is preferably 1,000 μm or less, more preferably 500 μm or less, still more preferably 300 μm or less, especially preferably 100 μm or less.

The electroconductive layer 12a is a layer having electrical conductivity and is constituted of, for example, a metal or an electroconductive polymer. Such electroconductive layer 12a can be formed by plating, chemical vapor deposition, sputtering, etc.

The thickness of the electroconductive layer 12a is not particularly limited. However, the thickness thereof is preferably 0.001 μm or larger, more preferably 0.01 μm or larger, still more preferably 0.03 μm or larger, especially preferably 0.05 μm or larger. Meanwhile, the thickness thereof is preferably 1,000 μm or less, more preferably 500 μm or less, still more preferably 300 μm or less, especially preferably 50 μm or less, most preferably 10 μm or less.

The first protrudent part 14 is a portion where the first adhesive layer 11 and the substrate for voltage application 12 extend and protrude with respect to the second adhesive layer 13 in a plane direction of the electrical debonding type adhesive sheet 10. The second protrudent part 15 is a portion where the substrate for voltage application 12 extends from the first protrudent part 14 and protrudes with respect to the first adhesive layer 11 in a plane direction of the electrical debonding type adhesive sheet 10.

Figure 2A:
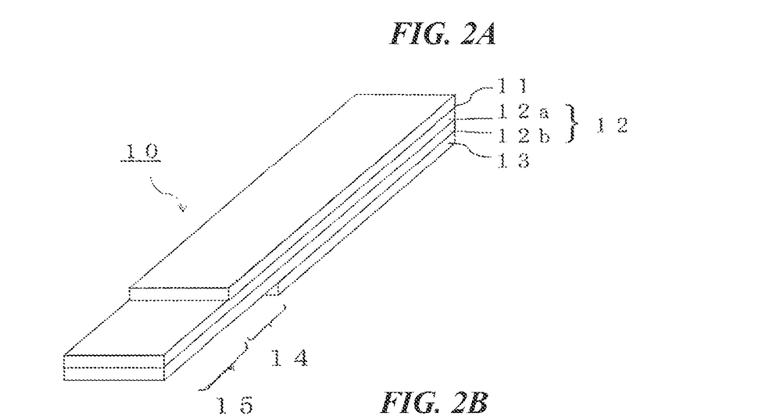
FIG. 2A is a slant view of one example of electrical debonding type adhesive sheets according to the first embodiment of the present invention.
Figure 2B:
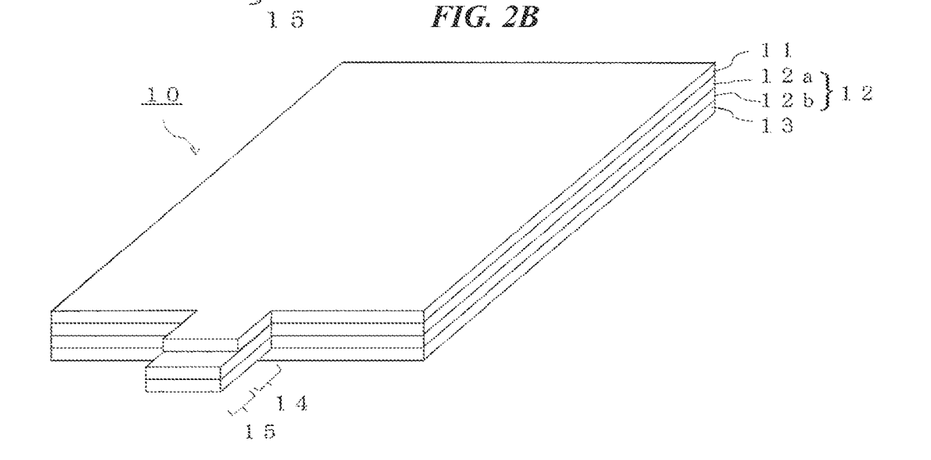
FIG. 2B is a slant view of another example of electrical debonding type adhesive sheets according to the first embodiment of the present invention.

The first protrudent part 14 and the second protrudent part 15 are not particularly limited in the dimensions and shapes thereof. For example, the adhesive sheet 10 may be a tape-shaped adhesive sheet 10 having a configuration that includes a first protrudent part 14 and a second protrudent part 15 which are disposed in an end portion of the adhesive sheet 10, as shown in FIG. 2A, or may be a sheet-shaped adhesive sheet 10 having a configuration that includes a first protrudent part 14 and a second protrudent part 15 which project, as shown in FIG. 2B.

Separators (release liners) may have be disposed on the surfaces of the first adhesive layer 11 and second adhesive layer 13 of the adhesive sheet 10 according to the first embodiment. The separators are an element for protecting the first adhesive layer 11 and second adhesive layer 13 of the adhesive sheet 10 from exposure, and are peeled from the adhesive sheet 10 when the adhesive sheet 10 is applied to adherends. The adhesive sheet 10 may be in a form in which the adhesive sheet 10 is in the state of having been sandwiched between two separators, or may be in a form obtained by winding the adhesive sheet 10 and a separator into a roll so that layers of the adhesive sheet 10 alternate with layers of the separator. Examples of the separator include bases having a releasing layer, lowly bondable bases constituted of a fluoropolymer, and lowly bondable bases constituted of a nonpolar polymer. The surface of the separator may have undergone a release treatment, antifouling treatment, or antistatic treatment. The thickness of the separator is, for example, 5-200 μm.

(Adhesive Force of the Adhesive Sheet)

It is preferable that the adhesive surfaces of the adhesive sheet 10, that is, the surface on the first adhesive layer 11 side and the surface on the second adhesive layer 13 side, have a 180° peel adhesive force (application to SUS304 plate; pulling speed, 300 mm/min; peeling temperature, 23° C.) of 0.1 N/10 mm or higher, from the standpoint of attaining satisfactory adhesive force. The 180° peel adhesive force of the adhesive sheet 10 can be measured, for example, in the following manner in accordance with JIS Z 0237.

The adhesive sheet 10 which is covered on both sides with separators is examined in the following manner. First, one of the separators is peeled off, and a poly(ethylene terephthalate) (PET) film having a thickness of 50 μm is thereafter adhered to the exposed adhesive surface to line the adhesive sheet 10. Next, a test piece [10 mm (width)×100 mm (length)] is cut out of the lined adhesive sheet 10. Subsequently, the other separator is peeled from this test piece and the test piece is then applied to a stainless-steel plate (SUS304) as an adherend. Thereafter, the test piece is press-bonded to the adherend by rolling a 2-kg roller thereon forward and backward once. This specimen is allowed to stand still for 30 minutes and then examined for 180° peel adhesive force (pulling speed, 300 mm/min; peel temperature, 23° C.) using a peel tester (trade name "Variable-Angle Peel Tester YSP", manufactured by Asahi Seiko Co., Ltd.).

(Methods for Producing the Adhesive Sheet)

The adhesive sheet 10 is produced, for example, in the following manner. First, an adhesive composition (first composition) for forming a first adhesive layer 11 and an adhesive composition (second composition) for forming a second adhesive layer 13 are produced. Next, the first composition is applied to the surface of the electroconductive layer 12a of a substrate for voltage application 12 and dried, thereby forming a first adhesive layer 11. Next, the second composition is applied to the surface of the base layer 12b of the substrate for voltage application 12 and dried, thereby forming a second adhesive layer 13. The adhesive sheet 10 can be produced, for example, in this manner.

Alternatively, the adhesive sheet 10 may be produced by the so-called transfer method. Specifically, a first adhesive layer 11 and a second adhesive layer 13 are first formed on respective separators (release liners). The first adhesive layer 11 is formed by applying the first composition, which is for forming a first adhesive layer 11, to the releasing surface of a given separator to form a coating film and then drying the coating film. The second adhesive layer 13 is formed by applying the second composition, which is for forming a second adhesive layer 13, to the releasing surface of a given separator to form a coating film and then drying the coating film. Next, the first adhesive layer 11 having the separator adherent thereto is adhered to the surface of the electroconductive layer 12a of a substrate for voltage application 12. Subsequently, the second adhesive layer 13 having the separator adherent thereto is adhered to the surface of the base layer 12b of the substrate for voltage application 12. The adhesive sheet 10 can be produced, for example, in this manner.

<Joined Body and Method for Joining and Separating Adherends>

Next, an explanation is given on a joined body obtained using the adhesive sheet 10 according to the first embodiment and a method for joining and separating adherends using the adhesive sheet 10 according to the first embodiment.

Figure 3:
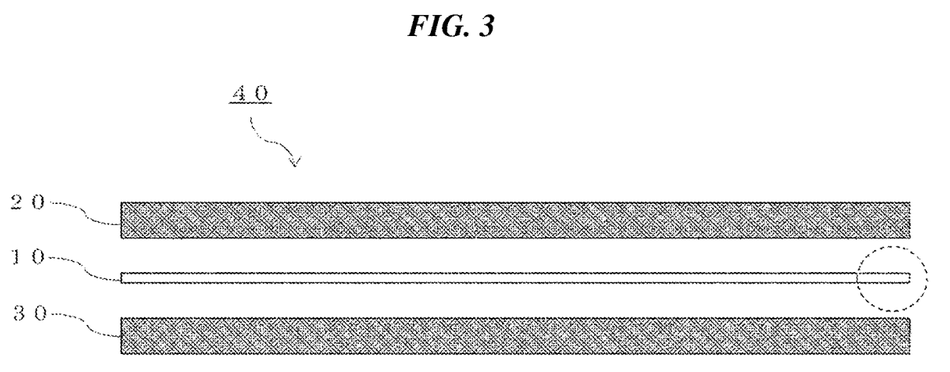
FIG. 3 is an exploded view of a joined body according to the first embodiment of the present invention.
Figure 4:
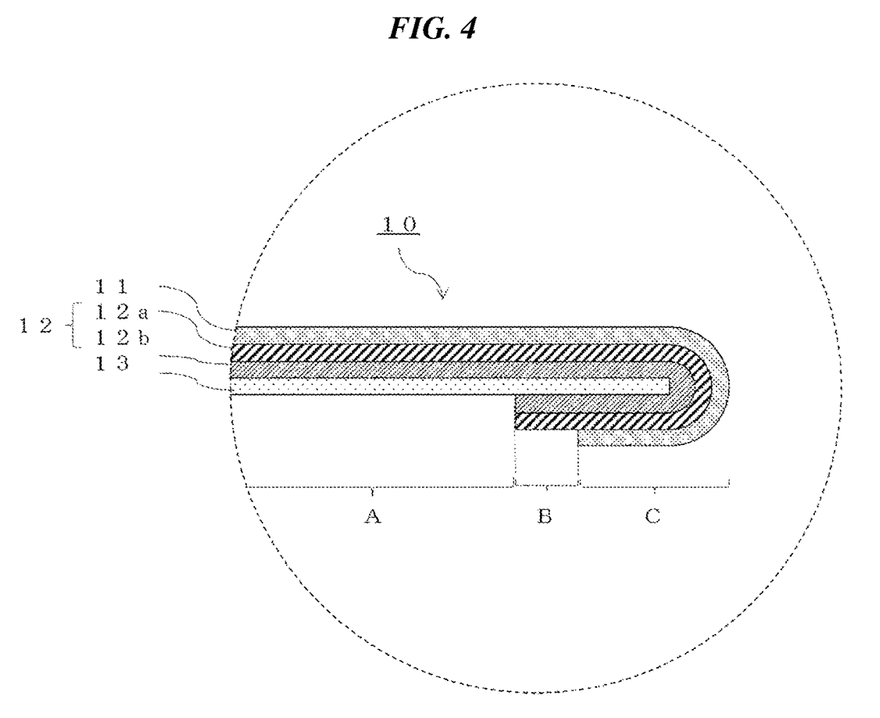
FIG. 4 is an enlarged view of the dotted-line-encircled portion of FIG. 3.

FIG. 3 is an exploded view of a joined body 40 according to the first embodiment of the present invention (hereinafter also referred to simply as "joined body 40 according to this embodiment" or "joined body 40"). FIG. 4 is an enlarged view of the dotted-line-encircled portion of FIG. 3.

The joined body 40 according to this embodiment is a joined body including the adhesive sheet 10 according to this embodiment, a first adherend 20, and a second adherend 30, wherein the first protrudent part 14 of the adhesive sheet 10 is folded back toward the second adhesive layer 13, the first adherend 20 is adhered to the electrical debonding type adhesive sheet 10 by a portion of the first adhesive layer 11 which is not folded back, and the second adherend 30 is adhered to the electrical debonding type adhesive sheet 10 by both the second adhesive layer 13 and the folded portion of the first adhesive layer 11 and is in contact with the electroconductive layer lying in the second protrudent part 15.

The method for joining and separating adherends according to this embodiment includes: folding back the first protrudent part 14 of the adhesive sheet 10 according to this embodiment toward the second adhesive layer 13; adhering a first adherend to a portion of the first adhesive layer 11 which is not folded back; adhering a second adherend 30 to both the second adhesive layer 13 and the folded portion of the first adhesive layer 11, thereby joining the first adherend 20 and the second adherend 30 to each other; and thereafter applying a voltage to the first adhesive layer 11 so as to result in a difference in potential in a thickness direction thereof, thereby separating the first adherend 20 and the second adherend 30 from each other.

Specifically, when the adhesive sheet 10 is used in joining a first adherend 20 and a second adherend 30, the first protrudent part 14 is folded back toward the second adhesive layer 13 as shown in FIG. 4. That portion of the first adhesive layer 11 which is not folded back (that is, the upper surface in FIG. 4) is applied to the first adherend 20, while the second adhesive layer and that portion of the first adhesive layer 11 which lies in the folded first protrudent part 14 are applied to the second adherend 30. In this operation, the position at which the first protrudent part 14 is folded is not particularly limited. The first protrudent part 14 may be folded back along the end of the second adhesive layer 13 as shown in FIG. 4, or may be folded back at a position other than the end of the second adhesive layer 13 as shown in FIG. 5.

Figure 5:
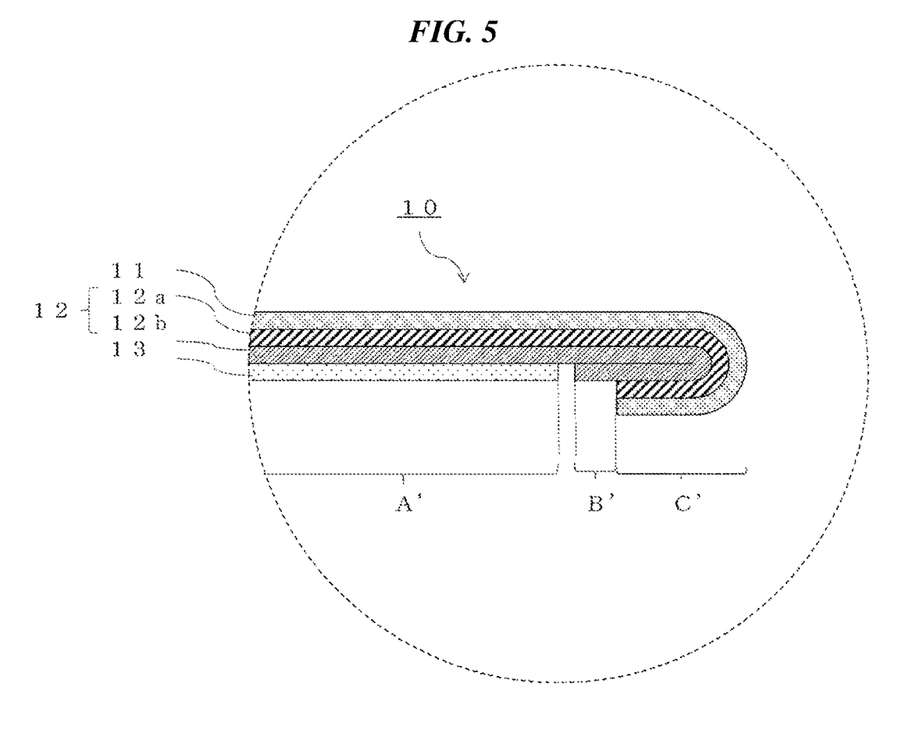
FIG. 5 is an enlarged view of the dotted-line-encircled portion of FIG. 3 in a modification example of the first embodiment of the present invention.

By thus joining the first adherend 20 and the second adherend 30 to each other, the second adherend 30 is made to be in stable electrical contact with the electroconductive layer 12a of the adhesive sheet 10 in region B shown in FIG. 4 (or region B' shown in FIG. 5). Furthermore, since the second adherend 30 is adhered to the adhesive sheet 10 by both the second adhesive layer 13 and that portion of the first adhesive layer 11 which lies in the folded first protrudent part 14, in regions A and C shown in FIG. 4 (or regions A' and C' shown in FIG. 5), stable adhesion can be ensured. There is hence no possibility that the electroconductive layer 12a of the substrate for voltage application 12 might come into contact with an unintended portion to make it impossible to properly apply a voltage to the first adhesive layer 11.

Furthermore, since the first protrudent part 14 is configured of some of the first adhesive layer 11 and some of the substrate for voltage application 12, that is, since the second adhesive layer 13 does not lie in the first protrudent part 14, the increase in thickness due to the folding is minimum. It is hence possible to attain stable joining and to ensure a stable electrical connection between the second adherend 30 and the electroconductive layer 12a.

The first adherend 20 and the second adherend 30 have electrical conductivity. Examples of materials constituting such adherends include aluminum, copper, iron, silver, and alloys containing these. The materials may be electroconductive polymers, etc. Electrical conductivity is required of at least portions necessary for producing the effects of the present invention. It is only required in the first adherend 20 that at least the portion which is in contact with the first adhesive layer 11 and a portion with which a terminal of a voltage application device is to be contacted have electrical conductivity and these portions are electrically connected. In the second adherend, it is only required that at least the portion which is in contact with the electroconductive layer 12a of the substrate for voltage application 12 and a portion with which the other terminal of the voltage application device is to be contacted have electrical conductivity and these portions are electrically connected.

Figure 6:
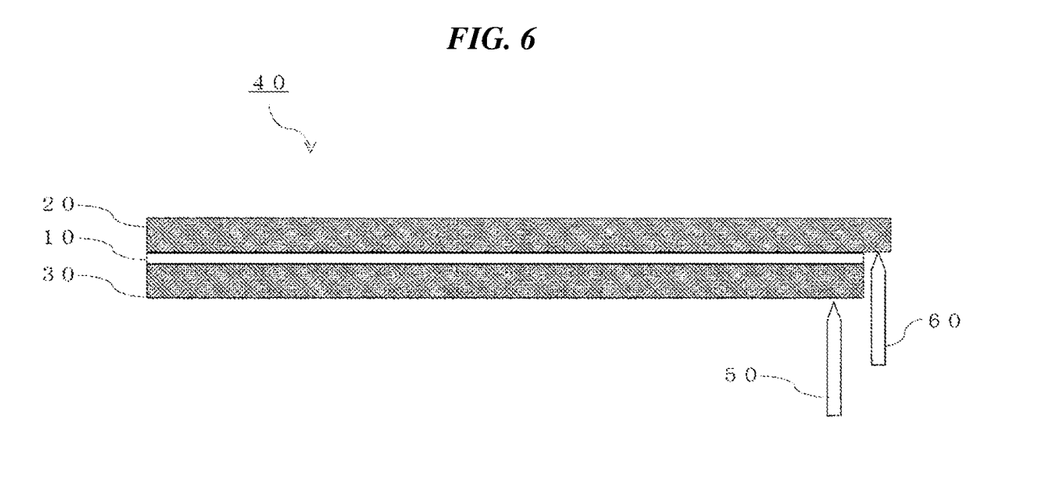
FIG. 6 is a diagrammatic view of a joined body according to the first embodiment of the present invention which is being electrically debonded.

In FIG. 6 is shown a diagrammatic view of the joined body 40 according to this embodiment in which the first adherend 20 and the second adherend 30 are being debonded. The first adherend 20 and the second adherend 30 are debonded while applying a voltage to the first adhesive layer 11 via the first adherend 20 and the electroconductive layer 12a of the adhesive sheet 10.

In the joined body 40 according to this embodiment, the electroconductive layer 12a of the adhesive sheet 10 is in electrical contact with the second adherend 30 and, hence, a voltage can be stably applied by contacting the terminals of a voltage application device with the first adherend 20 and the second adherend 30.

From the standpoint of operation efficiency, it is especially preferable in the voltage application that the terminals of a voltage application device are contacted, from the same direction, with the first adherend 20 and the second adherend 30 as shown in FIG. 6.

The voltage to be applied to the first adhesive layer 11 is preferably 1 V or higher, more preferably 3 V or higher, still more preferably 6 V or higher. Meanwhile, the applied voltage is preferably 100 V or less, more preferably 50 V or less, still more preferably 30 V or less, especially preferably 15 V or less. Applied voltages within such a range are suitable because the operation of separating the joined body can be efficiently performed. For example, in cases when the applied voltage is within such a range, an easily available power source such as a dry battery can be used for the voltage application device.

It is preferable that the period of voltage application to the first adhesive layer 11 is short. Specifically, the period of voltage application is preferably 60 seconds or less, more preferably 40 seconds or less, still more preferably 20 seconds or less. Voltage application periods within such a range are suitable for heightening the efficiency of the operation of separating the joined body.

Those preferred ranges of applied voltage and application period apply also in the second embodiment described below.

Second Embodiment

<Adhesive Sheet>

Figure 7:
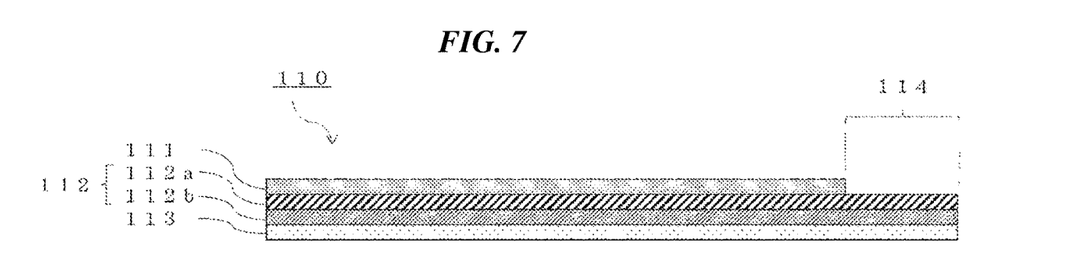
FIG. 7 is a diagrammatic view of an electrical debonding type adhesive sheet according to the second embodiment of the present invention.

FIG. 7 is a diagrammatic view of an electrical debonding type adhesive sheet 110 according to the second embodiment of the present invention (hereinafter also referred to simply as "adhesive sheet according to this embodiment" or "adhesive sheet 110"). The adhesive sheet 110 according to this embodiment is an electrical debonding type adhesive sheet 110 including a substrate for voltage application 112, which includes an electroconductive layer 112a and a base layer 112b, a first adhesive layer 111, which is constituted of an electrically debondable adhesive and is formed on the electroconductive layer 112a of the substrate for voltage application 112, and a second adhesive layer 113, which is formed on the base layer 112b of the substrate for voltage application 112, the electrical debonding type adhesive sheet 110 having a protrudent part 114 in which the second adhesive layer 113 and the substrate for voltage application 112 extend and protrude with respect to the first adhesive layer 111 in a plane direction of the electrical debonding type adhesive sheet 110.

The layers constituting the adhesive sheet according to the second embodiment are the same as in the adhesive sheet according to the first embodiment, and the only difference is the configuration of the protrudent part. The following explanation is given only on points in which the adhesive sheet according to this embodiment differs from the adhesive sheet according to the first embodiment.

The protrudent part 114 in the adhesive sheet 110 according to the second embodiment is a portion where the second adhesive layer 113 and the substrate for voltage application 112 extend and protrude with respect to the first adhesive layer 111 in a plane direction of the electrical debonding type adhesive sheet 110. The protrudent part 114 is not particularly limited in the dimensions and shape thereof. For example, the adhesive sheet 110 may be a tape-shaped adhesive sheet having a configuration that includes a protrudent part 114 disposed in an end portion of the adhesive sheet or may be a sheet-shaped adhesive sheet having a configuration that includes a protrudent part 114 which projects, as explained above with regard to the first protrudent part 14 and second protrudent part 15 of the first embodiment.

<Joined Body and Method for Joining and Separating Adherends>

Next, an explanation is given on a joined body obtained using the adhesive sheet 110 according to the second embodiment and a method for joining and separating adherends using the adhesive sheet 110 according to the second embodiment.

Figure 8:
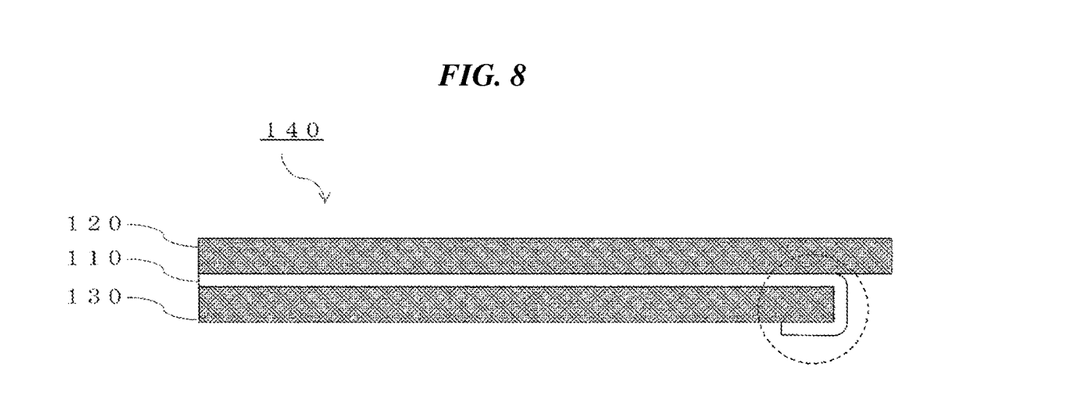
FIG. 8 is a diagrammatic view of a joined body according to the second embodiment of the present invention.
Figure 9:
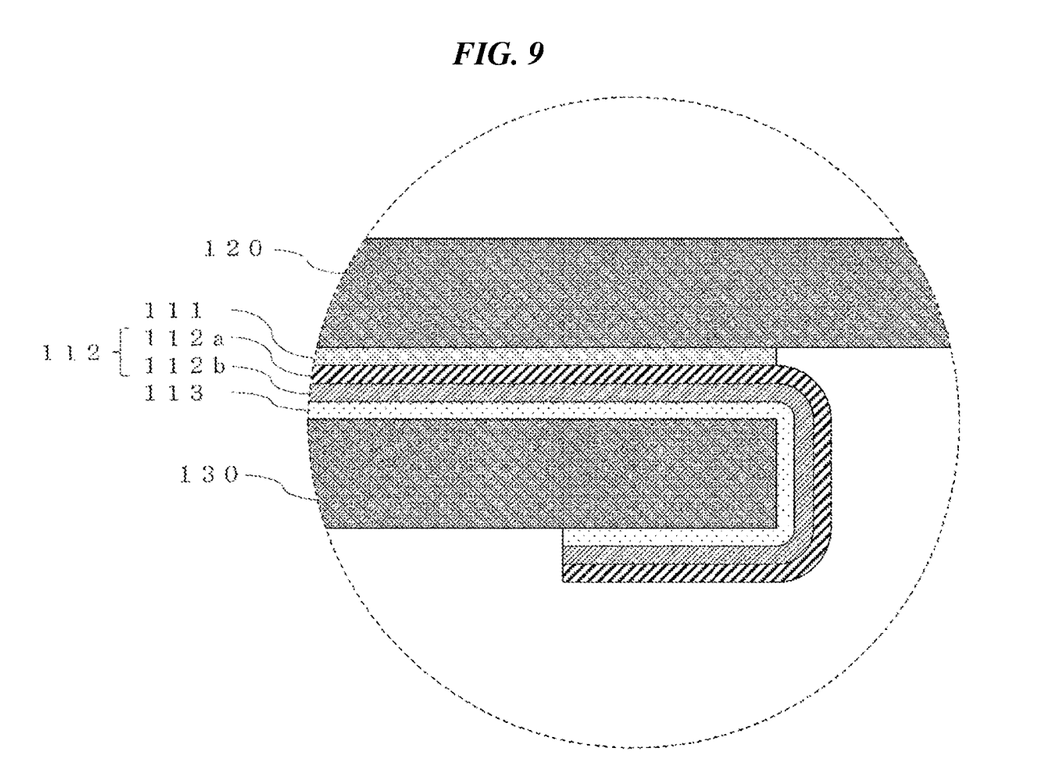
FIG. 9 is an enlarged view of the dotted-line-encircled portion of FIG. 8.

FIG. 8 is a diagrammatic view of a joined body 140 according to the second embodiment of the present invention (hereinafter also referred to simply as "joined body 140 according to this embodiment" or "joined body 140"). FIG. 9 is an enlarged view of the dotted-line-encircled portion of FIG. 8.

The joined body 140 according to this embodiment is a joined body including the adhesive sheet 110 according to this embodiment, a first adherend 120, and a second adherend 130, wherein the second adherend 130 is adhered to the electrical debonding type adhesive sheet by the second adhesive layer 113, some of the adhesive sheet 110 is folded back along an end of the second adherend 130 so that some of the second adherend 130 is sandwiched, at least some of the protrudent part 114 is adhered, by the second adhesive layer 113, to that surface of the second adherend 130 which is on the reverse side from the first adherend 120, and the first adherend 120 is adhered to the adhesive sheet 110 by a portion of the first adhesive layer 111 which is not folded back.

The method for joining and separating adherends according to this embodiment includes: folding back some of the adhesive sheet 110 according to this embodiment along an end of a second adherend 130 so that some of the second adherend 130 is sandwiched, and adhering the adhesive sheet 110 to the second adherend 130 by the second adhesive layer 113; applying a portion of the first adhesive layer 111 which is not folded back to a first adherend 120 to join the first adherend 120 and the second adherend 130 to each other so that at least some of the protrudent part 114 is adhered, by the second adhesive layer 113, to that surface of the second adherend 130 which is on the reverse side from the first adherend 120; and thereafter applying a voltage to the first adhesive layer 111 so as to result in a difference in potential in a thickness direction thereof, thereby separating the first adherend 120 and the second adherend 130 from each other.

Figure 10:
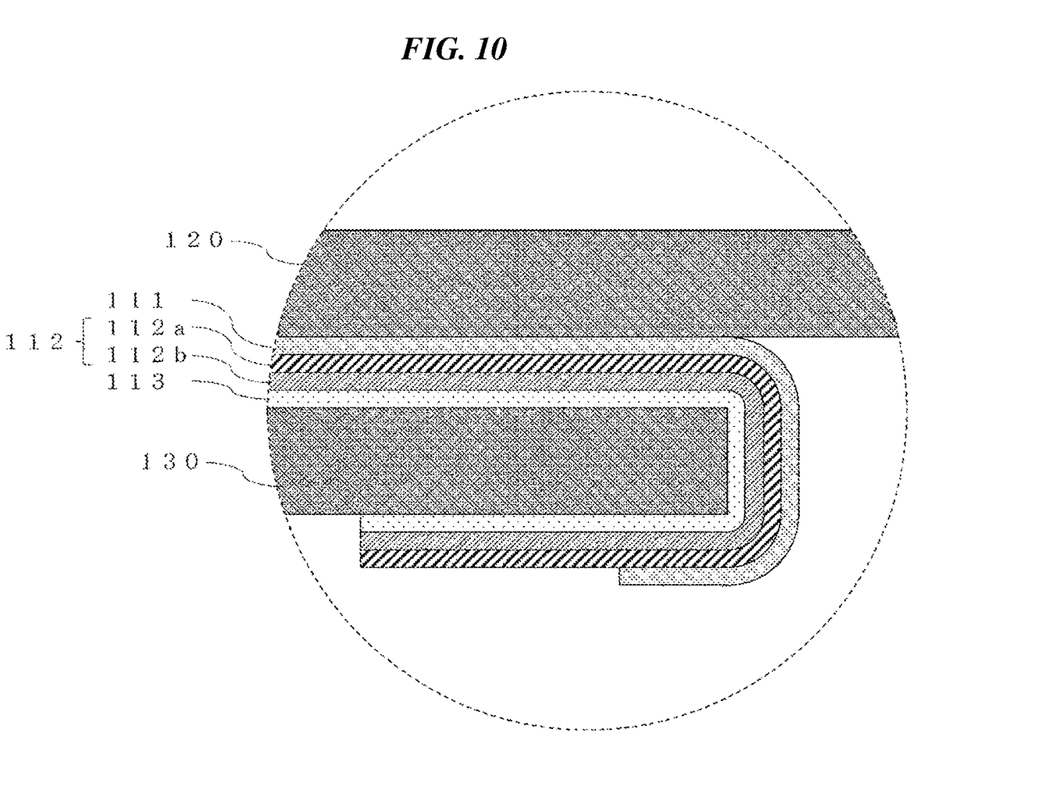
FIG. 10 is an enlarged view of the dotted-line-encircled portion of FIG. 8 in a modification example of the second embodiment of the present invention.

Specifically, when the adhesive sheet 110 is used in joining a first adherend 120 and a second adherend 130, some of the adhesive sheet 110 is folded back along an end of the second adherend 130 so that some of the second adherend 130 is sandwiched, as shown in FIG. 9. As a result, at least some of the protrudent part 114 is adhered, by the second adhesive layer 113, to that surface of the second adherend 130 which is on the reverse side from the first adherend 120. In this operation, the position at which the adhesive sheet 110 is folded is not particularly limited. Some of the adhesive sheet 110 may be folded back along the end of the first adhesive layer 111 as shown in FIG. 9, or may be folded back at a portion other than the protrudent part 114 as shown in FIG. 10. It is, however, preferable that some of the adhesive sheet 110 is folded back along the end of the first adhesive layer 111.

The first adherend 120 has electrical conductivity like the first adherend 20 in the first embodiment. Meanwhile, the second adherend 130 in this embodiment may or may not have electrical conductivity.

In the joined body 140 in which the first adherend 120 and the second adherend 130 are thus joined to each other, the exposed portion of the substrate for voltage application 112 which lies in the protrudent part is adhered, by the second adhesive layer 113, to that surface of the second adherend 130 which is on the reverse side from the first adherend. Since that portion of the substrate for voltage application 112 is hence stable, there is no possibility that the electroconductive layer 112a of the substrate for voltage application 112 might come into contact with an unintended portion to make it impossible to properly apply a voltage to the first adhesive layer 111.

Figure 11:
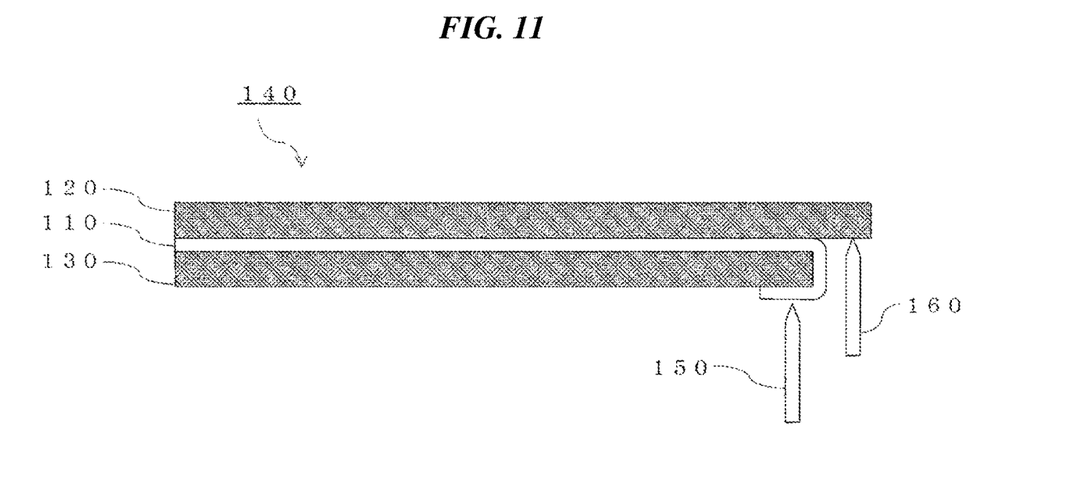
FIG. 11 is a diagrammatic view of a joined body according to the second embodiment of the present invention which is being electrically debonded.

In FIG. 11 is shown a diagrammatic view of the joined body 140 according to this embodiment in which the first adherend 120 and the second adherend 130 are being debonded. The first adherend 120 and the second adherend 130 are debonded while applying a voltage to the first adhesive layer 111 via the first adherend 120 and the electroconductive layer 112a of the adhesive sheet 110.

FIG. 11 shows a diagrammatic view of the joined body 140 according to this embodiment which is being electrically debonded. In this joined body 140, it is possible to apply a voltage to the first adhesive layer 111 of the adhesive sheet 110 via the first adherend 120 and that portion of the electroconductive layer 112a which lies in the protrudent part that is folded back so that some of the second adherend 130 is sandwiched. Stable voltage application is hence possible.

From the standpoint of operation efficiency, it is especially preferable in the voltage application that the terminals of a voltage application device are contacted from the same direction, as shown in FIG. 11.

In the joined body 40 according to this embodiment, some of the adhesive sheet 110 is folded back along an end of the second adherend 130 so that some of the second adherend 130 is sandwiched, and at least some of the protrudent part is adhered to that surface of the second adherend 130 which is on the reverse side from the first adherend 120. It is hence possible to stably perform voltage application by contacting the terminals of a voltage application device with that portion of the electroconductive layer 112a which is exposed in the protrudent part and with the first adherend 120.

From the standpoint of operation efficiency, it is especially preferable in the voltage application that the terminals of a voltage application device are contacted, from the same direction, with the first adherend 120 and the second adherend 130, as shown in FIG. 11.

While the invention has been described in detail and with reference to specific embodiments thereof, it will be apparent to one skilled in the art that various changes and modifications can be made therein without departing from the spirit and scope thereof. This application is based on a Japanese patent application filed on Mar. 8, 2018 (Application No. 2018-42353), the entire contents thereof being incorporated herein by reference. All the references cited here are incorporated herein as a whole.

REFERENCE SIGNS LIST 10, 110: Electrical debonding type adhesive sheet
11, 111: First adhesive layer
12, 112: Substrate for voltage application
12a, 112a: Electroconductive layer
12b, 112b: Base layer
13, 113: Second adhesive layer
14: First protrudent part
15: Second protrudent part
20, 120: First adherend
30, 130: Second adherend
40, 140: Joined body
50, 60, 150, 160: Terminal
114: Protrudent part

The invention claimed is:

1. A joined body comprising an electrical debonding adhesive sheet, a first adherend, and a second adherend, wherein the electrical debonding adhesive sheet comprises a substrate for voltage application comprising an electroconductive layer and a base layer, a first adhesive layer that is constituted of an electrically debondable adhesive and is formed on the electroconductive layer of the substrate for voltage application, and a second adhesive layer formed on the base layer of the substrate for voltage application, the electrical debonding adhesive sheet has a protrudent part in which the second adhesive layer and the substrate for voltage application extend and protrude with respect to the first adhesive layer in a plane direction of the electrical debonding adhesive sheet, the second adherend is adhered to the electrical debonding adhesive sheet by the second adhesive layer, some of the electrical debonding adhesive sheet is folded back along an end of the second adherend so that some of the second adherend is sandwiched, and at least some of the protrudent part is adhered, by the second adhesive layer, to that surface of the second adherend which is on the reverse side from the first adherend, and the first adherend is adhered to the electrical debonding adhesive sheet by a portion of the first adhesive layer which is not folded back.

* * * * *